United States Patent [19]

Hirata

[11] 4,114,157

[45] Sep. 12, 1978

[54] BEARING DETECTION SYSTEM

[75] Inventor: Toshikiyo Hirata, Samukawa, Japan

[73] Assignee: Toyo Ysushinki Kabushiki Kaisha, Kawasaki, Japan

[21] Appl. No.: 772,248

[22] Filed: Feb. 25, 1977

[30] Foreign Application Priority Data

Mar. 4, 1976 [JP] Japan .................................. 51-23560

[51] Int. Cl.² .............................................. G01S 3/28
[52] U.S. Cl. .................................................. 343/119
[58] Field of Search ........................................ 343/119

[56] References Cited

U.S. PATENT DOCUMENTS 3,329,956 7/1967 Caspers ................................ 343/119
3,465,342 9/1969 Delapalme ...................... 343/119 X Primary Examiner—Nelson Moskowitz
Assistant Examiner—Richard E. Berger

[57] ABSTRACT

A bearing detection system used in an Airborne Collision Avoidance System. The detection end of the system is formed as a directional antenna having 3 directional antenna elements extending radially at a 120° angle with each other. The antenna element has an actual length corresponding to λ/8, wherein λ is the wavelength of the receiving wave, but the element has an effective length corresponding to λ/4 by the provision of an impedance matching plate and a back lobe suppression plate. Bearings of the incoming wave can be detected by means of relative strength of the receiving signal levels of the three antenna elements obtained by amplitude comparison and by forming 3 bit truth table for six directions including the 3 directions of the antenna and 3 boundary directions thereof by the strength of the receiving signal received by the three antenna elements.

5 Claims, 9 Drawing Figures

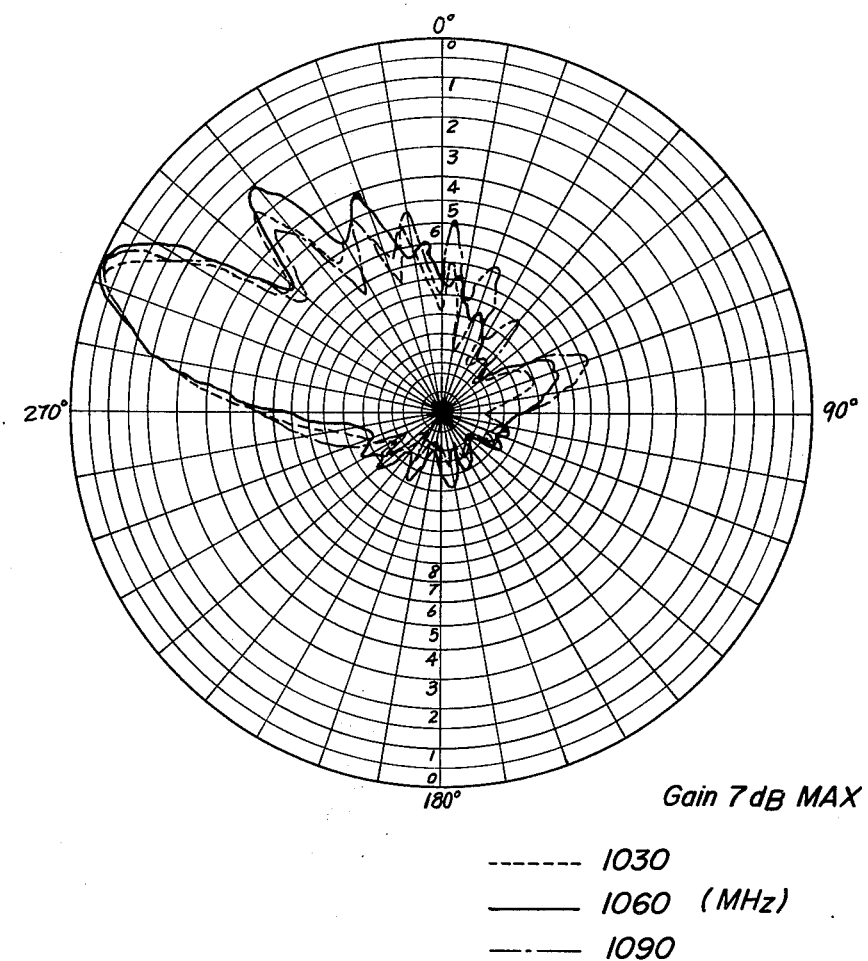
FIG_3
Gain 7 dB MAX
------- 1030
——— 1060 (MHz)
—·— 1090

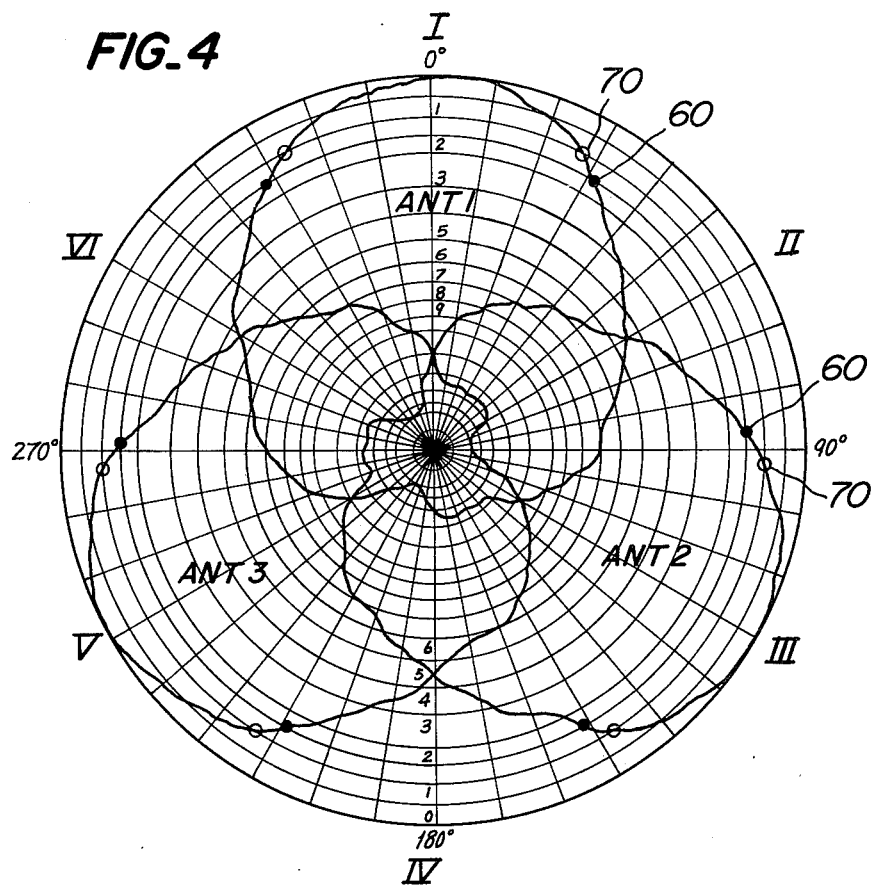

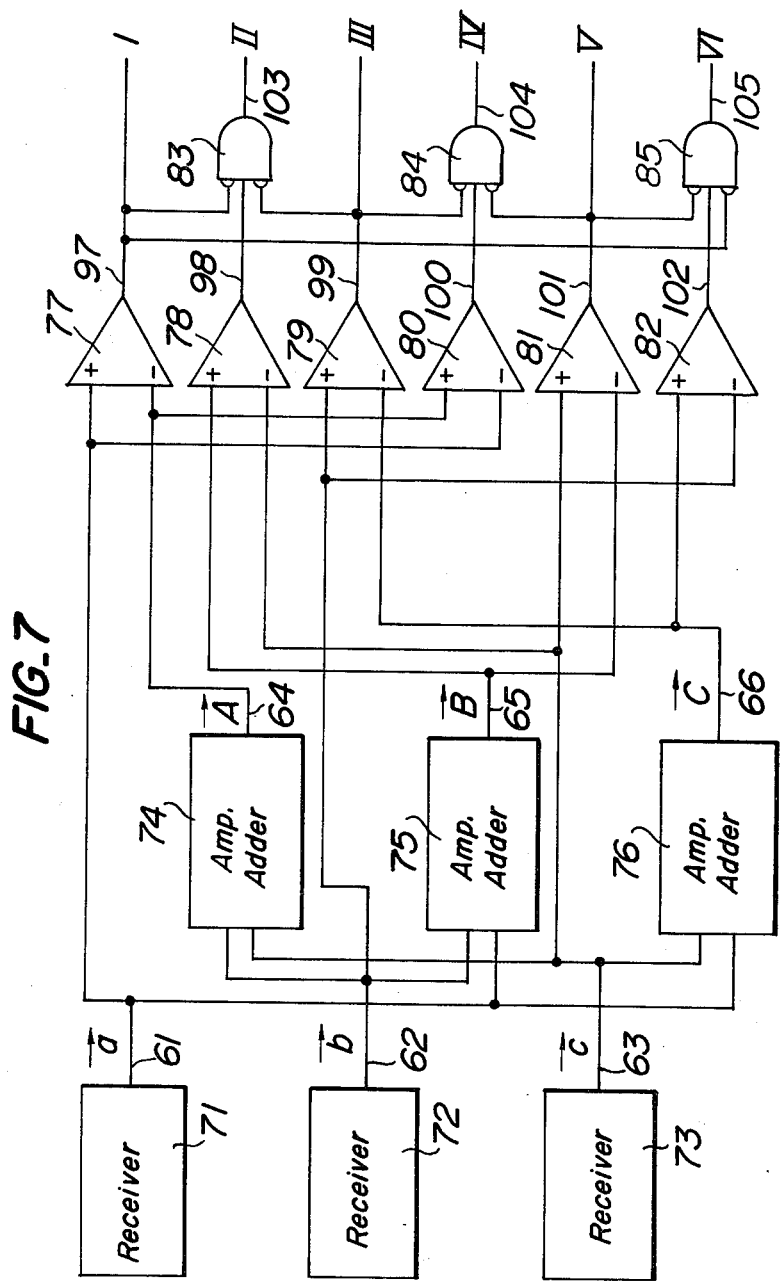

BEARING DETECTION SYSTEM

BACKGROUND OF THE INVENTION

1. Field of the Invention

The present invention relates to a direction finder or bearing detection system used in an Airborn Collision Avoidance System (hereinafter abridged as ACAS). The system is in general based on the principle of Air-Traffic-Control-Radar-Beacon-System (ATCRBS).

2. Description of the Prior Art

According to the operational principles of ACAS, presence of an approaching aircraft is at first coarsely identified by monitoring a response signal to an ATC transponder of the approaching aircraft. Then a MODE-A interrogation signal based on ICAO standard ANNX-10 is emitted automatically to request a response signal from the aircraft so as to confirm the existence of an approaching aircraft. If an approaching situation is identified and if the time before possible collision is judged to be less than 60 sec, emission of MODE-A and MODE-C interrogation signals is commenced. Information of the altitude of the approaching aircraft based on barometer reading and obtained from a response to the MODE-C interrogation signal is compared with the barometric altitude information of the one aircraft and the result is used for making a judgement whether to issue an instruction to steer toward more safer bearings. When there is no response to the MODE-C interrogation signal, such as for instance in the case of presence of incidental MODE-OFF request sent from a ground control station or in the case of gabbling, it is not possible to make a judgement for the steering instruction. Then only an Airborne Proximity Warning Indicator (APWI) alarm is delivered.

Such an existing system is no satisfactory in view of the importance of the security in the air traffic.

SUMMARY OF THE INVENTION

The present invention has for its object a novel bearing detection system having an improved function for more accurately indicating relative bearing toward an approaching aircraft to an extent to give relative position indication between two approaching aircrafts including distance, difference in altitude and direction information. The system of the present invention is to improve the function of the Airborne Proximity Warning Indicator (APWI) to afford a more easy judgement to a pilot. Also the system is intended to give a more effective means in the Air Traffic Control (ATC) system.

BRIEF DESCRIPTION OF THE DRAWINGS

FIG. 3 is a vertical directional characteristic of the same, FIG. 4 is an overall horizontal directional characteristic of the $\lambda/8$ corner reflector antenna, FIG. 6 is a Truth table of the antenna and the bearing used in the system of the present invention, and FIG. 7 is a block diagram of a bearing detection circuit for delivering an output as indicated in the Truth table shown in the above.

DESCRIPTION OF THE PREFERRED EMBODIMENT

Figure 1:
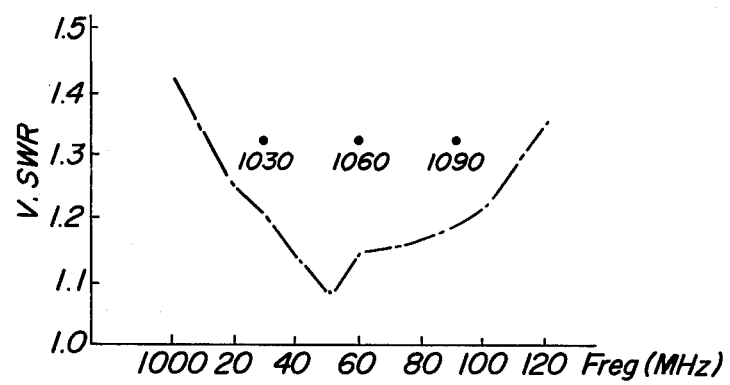
FIG. 1 is a diagram for showing VSWR frequency characteristic of one unit of a $\lambda/8$ corner reflection antenna suitably used in the system of the present invention.

The invention will now be described by referring to a preferred embodiment.

At first an antenna used at the detection end of the system of the invention will be explained.

As a bearing detection antenna of ACAS, the following characteristics are desirable.

(1) The shape and size should be small and light weight for easy mounting on an aircraft and also for achieving cheap manufacturing cost.

(2) The characteristics must be constant irrespective to the kind of aircraft to be mounted.

(3) The interface between the receiving system and the bearing detection system should easily be realized.

The following Table 1 shows features of various antennas for the bearing detection in comparison, which can be used in the system of the present invention. In the table, the last line indicated as "$\lambda/8$ corner reflector" is an antenna most suitably used in the system of the present invention.

The comparison in the table is made at a uniform operation frequency of 1,000 MHz band.

Table 1

| System | Size | Cost | Interface | Remark (Size mm) |
|---|---|---|---|---|
| $\lambda/4$ corner reflector | large | low | easy | difficult to mount on an existing aircraft (500 mm dia × 100 mm) |
| SLOT | small | medium | easy | |
| Herical | large | high | easy | 3 times of (120–150 mm dia × 200 mm) |
| $\lambda/8$ corner reflector | small | low | easy | easy to mount on an existing aircraft (200 mm dia × 50 mm) |

The general characteristics of the $\lambda/8$ corner reflector are as follows.

Operating frequency: 1000 MHz–1120 MHz
Impedance: 50 $\Omega$
VSWR: less than 1.5
Gain: 1 dB Actually measured characteristics of one embodiment of the $\lambda/8$ corner reflector antenna are shown in the drawings as follows.

Figure 2:
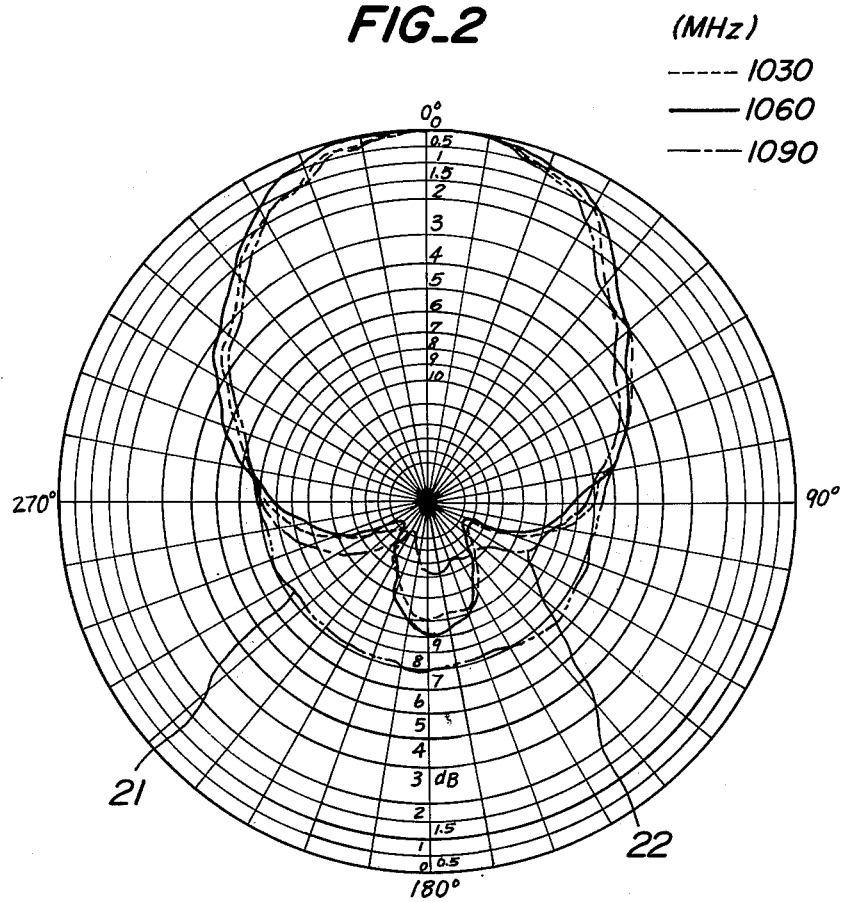
FIG. 2 is a horizontal directional characteristic of the same unit antenna.

VSWR: FIG. 1
Directional characteristics in horizontal plane: FIG. 2
Directional characteristics in vertical plane: FIG. 3
Overall directional characteristics in horizontal plane: FIG. 4

Since this $\lambda/8$ corner reflector antenna is most suitable to use in the system of the present invention, the invention will be explained referring to such an embodiment using the $\lambda/8$ corner reflector antenna.

Figure 5A:
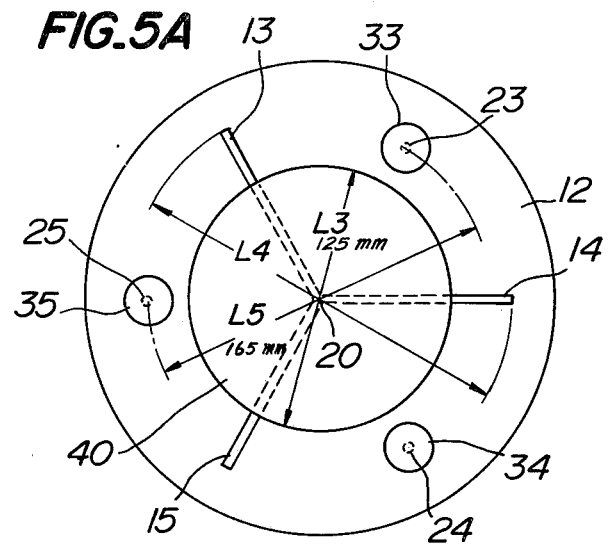
FIG. 5A is a plan view of the antenna.
Figure 5B:
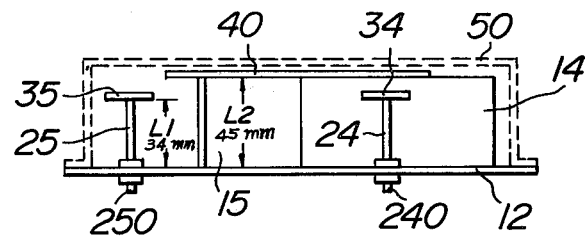
FIG. 5B is a front view of the same.
Figure 5C:
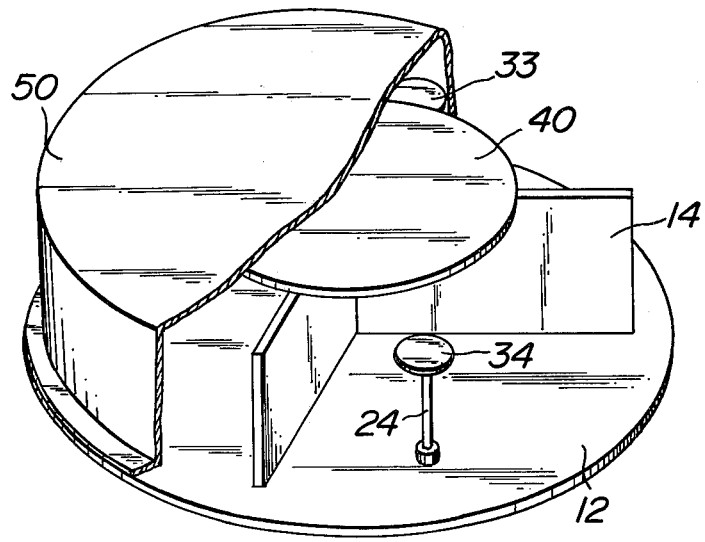
FIG. 5C is a perspective view of the same.

The details of the antenna are shown in FIGS. 5A, 5B and 5C. FIG. 5A is a plan view, FIG. 5B is a front view and FIG. 5C is a perspective view of the same.

The antenna comprises a base plate 12 formed of conductive flat circular plate. The base plate 12 has three corner reflector plates 13, 14 and 15 made of rectangular conductive plates and arranged rotationally symmetrically about a center point 20 and forming each 120° angle therebetween. The corner reflector plates 13, 14 and 15 define three sectors. At the middle of each c the three sectors, rod shaped antenna element 23, 24 or 25 is secured in parallel to the corner reflector plates. Output terminals 230, 240 and 250 are provided for the antenna elements 23, 24 and 25. Terminals 230 is not seen from the drawing.

The general construction of the antenna explained so far is the same as a conventional λ/4 corner reflector antenna.

The present invention has been realized by specially paying attention to the fact that a conventional λ/4 corner reflector having the basic construction as mentioned above has a limitation in its miniaturization. Therefore, the conventional antenna was difficult to mount on a medium or small aircraft. According to the present invention, the following construction is added to the conventional antenna and a substantial saving in the space factor can be realized.

In the present invention, the length of the three antenna elements 23, 24 and 25 is decreased about half of that of the conventional λ/4 corner reflector antenna to make it corresponding about λ/8, while leaving unchanged the proportion of the other portion and an impedance matching plate 33, 34 or 35 is mounted on the top of the respective antenna element 23, 24 or 25, respectively, in order to decrease the actual dimension of the antenna. By this means, the effective length of the antenna element is elongated nearly up to λ/4. However, by applying only the above means, the back lobe in the horizontal directional characteristics of a unit antenna becomes too large as can be seen from a curve 21 of FIG. 2. This back lobe affects the bearing detection function. Therefore, in the present invention, a back lobe suppression panel 40 (BLSP) having a shape of circular flat plate of a conductive material is arranged over the corner reflector plates 13, 14 and 15 in a position symmetrical about the center portion 20. Then the back lobe is sufficiently suppressed as shown by a curve 22 of FIG. 2 and the directional feature is enhanced.

By adding the back lobe suppression panel 40, the matching of the antenna element varies. Accordingly, the dimension of the impedance matching plates 33, 34 and 35 should be adjusted in some extent to attain the matching. FIG. 1 shows one embodiment of the matching characteristics. The back lobe suppression plate has the effect of equivalently enlarging the vertical length of the corner reflector, therefore, it may contribute greatly to the decrease of the overall dimension of the equipment and to the establishment of a miniaturized and light weight device.

Although a theoretical analysis of the directional characteristics of the antenna when added with the back lobe suppression plates has not been completed yet, the applicant had succeeded in obtaining desirable horizontal overall directional characteristics by experiments based on the principle of cut and try.

A non-conducting water-proof cover 50 is provided as shown in FIGS. 5B and 5C to protect the antenna elements.

In FIG. 5A and 5B, the most preferred size of the antenna used in an embodiment of the present invention is also indicated. The antenna obtains the horizontal overall directional characteristics shown in FIG. 4 in 1030 to 1090 MHz frequency band which is used in the ACAS in problem. Each one of the unit antenna may be formed as tapered rectangular shape.

The λ/8 corner reflector antenna having its overall horizontal directional characteristics is suitably used for direction detection in the system of the present invention.

Referring to FIG. 4, Greek numerals I to VI at periphery of the characteristic circle indicate various directions about its own aircraft. In the directions of I, III and V, one of antennas 23, 24 and 25 has a much higher receiving signal level than the two other antennas, respectively. In the directions of II, IV and VI, the antennas 23 and 24, 24 and 25, 25 and 23 have nearly same receiving level of about 6 dB, respectively, while the remaining one antenna has a very weak receiving signal level. Accordingly, six wave of incoming direction or bearing can clearly be identified by a mere comparison of the receiving signal level by using an amplitude comparator.

For the antenna and the bearing, the Truth table shown in FIG. 6 can be used. This Truth table has all the combinations of 3 bits if it is assumed that the two remaining directions 000 and 111 as not detectable. By this reason the detection error can be kept at very low value. Even if the characteristics of the receiver deteriorate to some extent, only minor error in the same or adjacent area may occur and there will be no misindication for the bearing or at least there will be no definite chance to indicate an opposite direction.

FIG. 7 shows a block diagram of an apparatus for making a bearing detection based on the Truth table shown in FIG. 6 from the receiving signal. Referring to FIG. 7, 71, 72 and 73 are receivers having same characteristics and each applied with an input signal from the antenna elements 23, 24 and 25, respectively. The receivers 71, 72 and 73 demodulate and amplify the input signals and deliver the output signals $a$, $b$ and $c$ having amplitude corresponding thereto on output conductors 61, 62 and 63, respectively.

Amplitude adders 74, 75 and 76 deliver output signals A, B and C on conductors 64, 65 and 66. The signals A, B and C have the following relation.

$$A = b+c$$

$$B = a+b$$

$$C = c+a$$

Amplitude comparators 77, 78 ... 82 are applied with output of the receivers 71, 72 and 73 and amplitude adders 74, 75 and 76 as shown in the logic diagram of FIG. 7 and deliver respective output having logic value "1" to the output conductors 97, 98 ... 102 in the following condition.

| logic value | output conductor | |
|---|---|---|
| 1 | 97 | a-A > 6 dB |
| 1 | 98 | B-c > 6 dB |
| 1 | 99 | b-C > 6 dB |
| 1 | 100 | A-a > 6 dB |
| 1 | 101 | C-B > 6 dB |
| 1 | 102 | C-b > 6 dB |

The meaning of 6 dB will be explained later on.

Logic gates 83, 84 and 85 are connected to the output conductors as shown in the diagram. Then, gates deliver the output signal having logic value "1" in the following condition.

| logic value | output conductor | |
|---|---|---|
| 1 | 103 | 98=1 and 97 or 99=1 |
| 1 | 104 | 100=1 and 99 or 101=1 |
| 1 | 105 | 102=1 and 101 or 97=1 |

By using the output signals of the logic gates 83, 84 and 85 together with that of the amplitude comparators 77 to 82, the Truth table as shown in FIG. 6 can be completed and the six directions I to VI can be identified clearly. In this system even if an error is involved it results in only one shift to the adjacent direction occurs.

In FIG. 4, six black dots 60 show boundaries occurring in the Truth table. If it is desired to move the black dots to change the relative width of the respective divided region, the aforementioned value of 6 dB may be altered. When the value is adjusted at 7 dB, the boundaries are moved to white circle 70 as shown in FIG. 4.

The directional characteristics of an antenna used for the frequency band of 1030 to 1090 MHz as shown in FIG. 4 can only be obtained by an actual embodiment fulfilling the following condition.

$L_1 > 20$ mm ($L_1$ is height of an antenna element)
$L_2 > 25$ mm ($L_2$ is height of BLSP)
149 mm $> L_3 >$ 100 mm ($L_3$ is the diameter of BLSP)
$L_2 > L_1$
$L_4 > L_5 > L_3$
($L_4$ is the diameter of a circle passing the end of the corner reflector plate)
($L_5$ is the diameter of a circle passing the antenna element)
170 mm $> L_5 >$ 136 mm If the applicable frequency is altered the above numerical values may be altered accordingly.

The antenna used in the system of the present invention has a most small size as shown in the foregoing table. For instance, the space occupied of the antenna can be made ½ that compared with the conventional $\lambda/4$ antenna. Accordingly, the system may be easily mounted on any kind of aircraft including a small size aircraft.

Although the above explanation had been given for the use of a $\lambda/8$ corner reflector antenna as the detection end, the detection end equipment is not limited to such a particular device and any apparatus having the overall directional characteristic as explained above may be used in the same manner. The detecting level of 6 dB as explained above may be altered according to the requirement.

The system has the advantage in that a clear identification of six horizontal bearings is possible which is a necessary and sufficient condition to the Airborne Collision Avoidance System (ACAS). The system has also the feature of delivering its output by errorless 3 bit digital signal without redundancy so that the apparatus may be realized in a very simple manner and therefore at a cheap cost.

The system is very effective for avoiding collision of aircraft.

What is claimed is:

1. A bearing detection system having at its detection end a directional antenna comprising three radially extending directional antenna elements arranged at a 120° angle to each other and defining therebetween three directional antenna sectors, the detection system having means for making amplitude comparison of receiving signals received by said three directional antenna elements and forming a three bit truth table formed by the strength of the three receiving signals against six directions including the three directions of the antenna elements and the three directions of the sectors between said antenna elements, wherein in the truth table the signal values corresponding to 000 and 111 are made as undetectable.

2. A bearing detection system as claimed in claim 1, wherein each of the directional antenna elements is formed of a corner reflector antenna.

3. A bearing detection system as claimed in claim 1, wherein the directional antenna is a corner reflector antenna comprising a conductive base plate and corner reflectors formed by three conductive plates arranged rotationally symmetrically on said conductive base plate to form angle of 120° therebetween and to define therebetween three sectors, a rod shaped antenna element provided at center of each of said sectors, wherein the length of the rod shaped antenna element is made shorter than ¼ of wavelength $\lambda$ of the receiving signal wave, and the rod shaped antenna element is provided with an impedance matching plate at top thereof to make its effective length corresponding to $\lambda/4$, and a back lobe suppression panel formed of a conductive plate and arranged in parallel to the base plate and rotationally symmetrically with the corner reflectors to cover part of the corner reflectors.

4. A bearing detection system as claimed in claim 3, wherein the directional antenna is so formed as to match a frequency band of 1000 MHz to 1120 MHz, and the dimension thereof is so arranged that length $L_1$ of the rod shaped antenna element is more than 20 mm, height $L_2$ of the back lobe suppression plate (BLSP) is more than 25 mm, $L_2 > L_1$, and (diameter of a circle passing end of the corner reflector) > (diameter of a circle passing the antenna element) > (diameter of the BLSP).

5. A bearing detection system as claimed in claim 4, wherein the dimension of the antenna is proportionally altered to the frequency if the applicable frequency is altered.

* * * * *